(12) United States Patent
Nakashima et al.

(10) Patent No.: US 8,984,160 B2
(45) Date of Patent: Mar. 17, 2015

(54) APPARATUS AND METHOD FOR STORING A PORT NUMBER IN ASSOCIATION WITH ONE OR MORE ADDRESSES

(75) Inventors: Kohta Nakashima, Kawasaki (JP); Akira Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 13/295,476

(22) Filed: Nov. 14, 2011

(65) Prior Publication Data

US 2012/0151090 A1 Jun. 14, 2012

(30) Foreign Application Priority Data

Dec. 8, 2010 (JP) ................................. 2010-273982

(51) Int. Cl.
*H04L 12/931* (2013.01)
*H04L 12/939* (2013.01)
*H04L 12/947* (2013.01)

(52) U.S. Cl.
CPC .............. *H04L 49/358* (2013.01); *H04L 49/65* (2013.01); *H04L 49/557* (2013.01); *H04L 49/25* (2013.01)
USPC ............................. 709/238; 709/239; 709/242

(58) Field of Classification Search
CPC ..... H04L 49/357; H04L 12/00; H04L 49/358; H04L 45/28; H04L 45/22; H04L 49/25
USPC .................. 709/238, 239, 240–244
See application file for complete search history.

(56) References Cited

U.S. PATENT DOCUMENTS

| | | | |
|---|---|---|---|
| 7,899,050 B2 * | 3/2011 | Craddock et al. | 370/390 |
| 2003/0021223 A1 * | 1/2003 | Kashyap | 370/217 |
| 2003/0067930 A1 * | 4/2003 | Salapura et al. | 370/412 |
| 2004/0024903 A1 * | 2/2004 | Costatino et al. | 709/238 |
| 2005/0025055 A1 * | 2/2005 | Jain et al. | 370/235 |
| 2005/0083337 A1 * | 4/2005 | Jaspers | 345/531 |
| 2005/0141518 A1 * | 6/2005 | Schiller et al. | 370/395.31 |
| 2006/0114918 A1 * | 6/2006 | Ikeda et al. | 370/408 |
| 2007/0217346 A1 * | 9/2007 | Zheng et al. | 370/255 |
| 2008/0056246 A1 * | 3/2008 | McGee et al. | 370/389 |
| 2009/0016332 A1 | 1/2009 | Aoki et al. | |
| 2009/0296569 A1 * | 12/2009 | Ramalho Ribeiro Dos Santos et al. | 370/222 |
| 2010/0034081 A1 * | 2/2010 | Yoshimura | 370/228 |
| 2011/0161520 A1 * | 6/2011 | Horiuchi et al. | 709/244 |

FOREIGN PATENT DOCUMENTS

| | | |
|---|---|---|
| JP | 2005-333220 | 12/2005 |
| JP | 2009-020797 | 1/2009 |

* cited by examiner

*Primary Examiner* — Douglas Blair
*Assistant Examiner* — Linh T Nguyen
(74) *Attorney, Agent, or Firm* — Fujitsu Patent Center

(57) ABSTRACT

A port number is stored in a memory in association with one or more addresses using a data block by which at least one port number associated with a predetermined number of consecutive addresses is written into the memory. Further, a first port number assigned to output ports each being provided for different one of a plurality of relay nodes is stored in association with first consecutive addresses in such a manner that one or more data blocks including the first port number associated with the first consecutive addresses are written into the memory.

6 Claims, 19 Drawing Sheets

FIG. 15

| BASE \ OFFSET | 0 | 1 | 2 | 3 | ... | 16 | 17 | 18 | 19 | ... | 32 | 33 | 34 | 35 | ... | 48 | 49 | 50 | 51 | ... | 63 |
|---|---|---|---|---|---|---|---|---|---|---|---|---|---|---|---|---|---|---|---|---|---|
| 0 | a | a | a | a |  | a | a | a | a |  | a | b | b | b |  | b | b | b | b |  | b |
| 64 | b | c | c | c |  | c | c | c | c |  | c | c | d | d |  | d | d | d | d |  | d |
| 128 | d | e | e | e |  | e | e | e | e |  | e | f | f | f |  | f | f | f | f |  | f |
| 192 | f | g | g | g |  | g | g | g | g |  | g | h | h | h |  | h | h | h | h |  | h |
| ... |

APPARATUS AND METHOD FOR STORING A PORT NUMBER IN ASSOCIATION WITH ONE OR MORE ADDRESSES

CROSS-REFERENCE TO RELATED APPLICATION

This application is based upon and claims the benefit of priority of the prior Japanese Patent Application No. 2010-273982, filed on Dec. 8, 2010, the entire contents of which are incorporated herein by reference.

FIELD

The present invention relates to an apparatus and method for storing a port number in association with one or more addresses.

BACKGROUND

In a large-scale cluster network, a multi-path network having a plurality of routes between any two nodes, such as a fat-tree network or torus network, is used. Main objects to use a multi-path network are: (1) to obtain high performance, specifically, to obtain high throughput by distributing a load to a plurality of routes and (2) to avoid trouble, specifically, to avoid the inability to communicate in case of a failure occurrence in a route by using an alternative route.

Recently, technology referred to as InfiniBand has been developed as cluster network technology. A network in which InfiniBand is used will be referred to below as the InfiniBand network.

FIG. 1 is a diagram illustrating an example of an InfiniBand network system having a fat-tree structure. In FIG. 1, switches SP1 to SP3, switches LF1 to LF3, and compute nodes N1 to N9 are connected through an InfiniBand network so as to form a fat tree.

Compute nodes N1 to N9 are computers that perform prescribed operations by communicating with each other via switches LF1 to LF3 and switches SP1 to SP3. The numbers 1 to 9 enclosed in the circles are addresses (local identifiers (LIDs)) assigned to compute nodes N1 to N9, respectively. With the InfiniBand network, an address assigned to each of compute nodes N1 to N9 is represented by a 16-bit value.

Switches LF1 to LF3 are so-called leaf switches, each of which is directly connected to some of compute nodes N1 to N9. Switches SP1 to SP3 are so-called spine switches that couples leaf switches LF1 to LF3 each other. Numbers depicted beside each of ports of switches indicates addresses assigned to compute nodes to which packets having the addresses as destination addresses are to be forwarded via the each port serving as an output port. For example, when a packet having a destination address of 4 arrives at switch SP1, the packet is forwarded to switch LF2 via a port coupled to leaf switch LF2. In the following description, for the ease of explanation, a port serving as an output port will be also expresses simply as "an output port", a compute node address depicted beside each of ports of switches will be also expressed as "a destination address" implying a destination address of a packet to be forwarded from the each port to the corresponding compute node. In this way, destination addresses are associated with each of output ports of switches. In FIG. 1, labels "a", "b", and "c" indicate port numbers assigned to ports provided for each of leaf switches. In the case, the same port numbers "a", "b", and "c" are assigned to ports of each of the leaf switches.

"(To: x, y, z)" described for each of spine switches SP1 to SP3 indicates that a packet having a destination address of x, y, or z is relayed by the each spine switch. For example, a packet having a destination address of 1, 4, or 7 is forwarded via spine switch SP1, a packet having a destination address of 2, 5, or 8 is forwarded via spine switch SP2, and a packet having a destination address of 3, 6, or 9 is forwarded via spine switch SP3, as illustrated in FIG. 2. When a leaf switch receives a packet destined for a compute node directly connected to the leaf switch, the packet is directly forwarded to the compute node without forwarding to a spine switch. For example, when leaf switch LF1 receives a packet having a destination address of 1, 2, or 3, the packet is directly forwarded to compute nodes N1, N2, or N3, respectively, without being forwarded to any spine switch.

In FIG. 1, when any one of spine switches has failed and communication thereof has been disabled, a route switchover is made to bypass the failed spine switch.

FIG. 2 is a schematic diagram illustrating an example of a route switchover when a spine switch has failed.

FIG. 2 illustrates a case in which spine switch SP1 has failed, as depicted by dashed lines. In this case, in leaf switches LF1, LF2, and LF3, the destination addresses (depicted in dotted rectangular) that have been associated with the ports that were coupled to spine switch SP1 are newly associated with other ports. In FIG. 2, the newly associated destination addresses are underlined. For example, in leaf switch LF1, destination address 4 is newly associated with the port coupled to spine switch SP2, and destination address 7 is newly associated with the port coupled to spine switch SP3. As a result, a packet having destination address 4 or 7 may be forwarded without passing through the failed spine switch SP1.

In a conventional InfiniBand network system, consecutive addresses are assigned to a group of compute nodes connected to the same leaf switch. That is, after first consecutive addresses have been assigned to a first group of compute nodes directly connected to a first leaf switch, second consecutive addresses following the first consecutive addresses are assigned to a second compute nodes directly connected to a next leaf switch. For example, in FIG. 1, first consecutive addresses 1 to 3 are assigned to first compute nodes directly connected to first leaf switch LF1, and second consecutive addresses 4 to 6 are assigned to second compute nodes directly connected to second leaf switch LF2.

The N-th port from the left on the upper side of each leaf switch is coupled to the N-th spine switch from the left. In FIG. 1, for example, a port having port number "a" in each leaf switch is coupled to spine switch SP1, a port having port number "b" in each leaf switch is coupled to spine switch SP2, and a port having port number "c" in each leaf switch is coupled to spine switch SP3. In other words, the N-th spine switch from the left binds the N-th ports from the left on the upper side of all the leaf switches. That is, the N-th spine switch from the left relays packets having destination addresses associated with the N-th ports from the left on the upper side of all the leaf switches.

According to the above mentioned connection configuration and setting of communication routes, a plurality of compute nodes directly connected to a first leaf switch are able to concurrently communicate with the other compute nodes each directly connected to one of leaf switches other than the leaf switch, using different communication routes. That allows a network load to be appropriately distributed. For example, suppose that communication between compute nodes N1 and N4 (communication 1), communication between compute nodes N2 and N5 (communication 2), and communication between compute nodes N3 and N6 (communication 3) are performed concurrently. Then, communication 1 is performed via spine switch SP1, communication 2 is performed via spine switch SP2, and communication 3 is performed via spine switch SP3.

FIG. 3 is a diagram illustrating an example of an InfiniBand network system having a fat-tree structure. The network depicted in FIG. 3 is larger in size than the network in FIG. 1. In FIG. 3, labels "a" to "p" indicate port numbers assigned to ports provided for each of leaf switches. In the case, the same port numbers "a" to "p" are assigned to ports of each of the leaf switches, in a manner similar to the case of FIG. 1.

For example, the network in FIG. 3 includes 512 compute nodes N1 to N512, 32 leaf switches LF1 to LF32 each of which has 32 ports, and 16 spine switches SP1 to SP16 each of which has 32 ports. "(To: n mod 16)" described for each spine switch indicates that a packet having a destination address that produces "n" as the remainder when divided by 16 is relayed by the each spine switch. For example, a packet having a destination address that produces 1 as the remainder when divided by 16 passes through spine switch SP1, and a packet having a destination address that produces 2 as the remainder when divided by 16 passes through spine switch SP2. Similarly, a packet having a destination address that produces 0 as the remainder when divided by 16 passes through spine switch SP16. In the network of FIG. 3 as well, when any one of spine switches has failed and communication has been disabled, a route switchover is made to bypass the failed spine switch.

FIG. 4 is a diagram illustrating an example of a route switchover when a spine switch has failed.

FIG. 4 illustrates a case where there exists a fault occurring in spine switch SP1, as depicted by dashed lines in FIG. 4. In this case, in leaf switches LF1 to LF32, the destination addresses that have been associated with ports each having port number "a" and being coupled to spine switch SP1 (that is, the destination addresses each producing 1 as the remainder of the division by 16) need to be reassigned to other ports each having one of port numbers "b" to "p".

Each switch has a forwarding database (FDB) that stores route information indicating correspondence between destination addresses and port numbers assigned to output ports.

FIG. 5 is a diagram illustrating a configuration example of a FDB included in an InfiniBand switch. In the FDB of FIG. 5, the letters "a" to "p" indicate port numbers, and a destination address associated with a port number is identified by adding a value that corresponds to the port number in the row labeled with "OFFSET", to a value that corresponds to the port number in the column labeled with "BASE". For example, a packet having a destination address of 1 (0+1) needs to be sent from an output port having port number "a". Similarly, it is found that a packet having a destination address of 67 (64+3) needs to be sent from an output port having port number "c". Although a FDB may be implemented as one-dimensional information, FIG. 5 represents the FDB in a two-dimensional form to facilitate understanding. In the following description, an output port having a port number "x" will be also expressed as "port x" for ease of explanation.

When a fault has occurred in spine switch SP1 as illustrated in FIG. 4, output ports having port number "a" and being connected to spine switch SP1 are no longer used in each leaf switch. In FIG. 5, therefore, the destination addresses assigned to ports having port number "a" need to be reassigned to ports having port numbers other than "a". That is, portions enclosed by the dashed-line rectangles 21, 22, 23, and 24 in FIG. 5, which correspond to output ports having port number "a", need to be changed. In the FDB in the InfiniBand switch, however, 64 destination addresses are processed as one data block that is updated at a time. That is, data included in a row enclosed by a heavy line in FIG. 5 is updated at a time as one data block. When a fault has occurred in spine switch SP1, therefore, all the data blocks 31, 32, 33, and 34 in the FDB need to be updated. This is also the case when a fault has occurred in a spine switch other than spine switch SP1.

For example, it takes about 400 μs to about 1000 μs in updating one data block of the FDB. With a large network, this update time becomes so large that it cannot be negligible. For example, a system including 200 to 4000 compute nodes has been already constructed, and a system including more than 10,000 compute nodes, as illustrated in FIG. 6, will be constructed in the near future.

FIG. 6 is a diagram illustrating an example of an InfiniBand network system having a fat-tree structure. In FIG. 6, an InfiniBand network includes 18 spine switches each having 648 ports, 648 leaf switches each having 36 ports, and 11,664 compute nodes. When any one of spine switches has failed in FIG. 6, it is expected that about 47 seconds to about 118 seconds are needed for updating the FDB in each leaf switch. These time values are very large ones in terms of time acceptable to network communication.

Japanese Laid-open Patent Publication No. 2005-333220 discloses technology that uses an address conversion table to simplify the update of route information.

However, when an address conversion table is used, addresses assigned to the same entry in the address conversion table are always assigned to the same port. This is problematic in that the addresses cannot be easily reassigned to different ports to distribute a load.

SUMMARY

According to an aspect of an embodiment, there is provided an apparatus and method for storing a port number in association with one or more addresses using a data block by which at least one port number associated with a predetermined number of consecutive addresses is written into a memory. A first port number assigned to output ports each being provided for different one of a plurality of relay nodes is stored in association with first consecutive addresses in such a manner that one or more data blocks including the first port number associated with the first consecutive addresses are written into the memory.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 15 illustrates an example of route information being set in a FDB of a leaf switch, according to a first embodiment;

DESCRIPTION OF EMBODIMENTS

Embodiments of the disclosure will be described with reference to the drawings.

Figure 7:
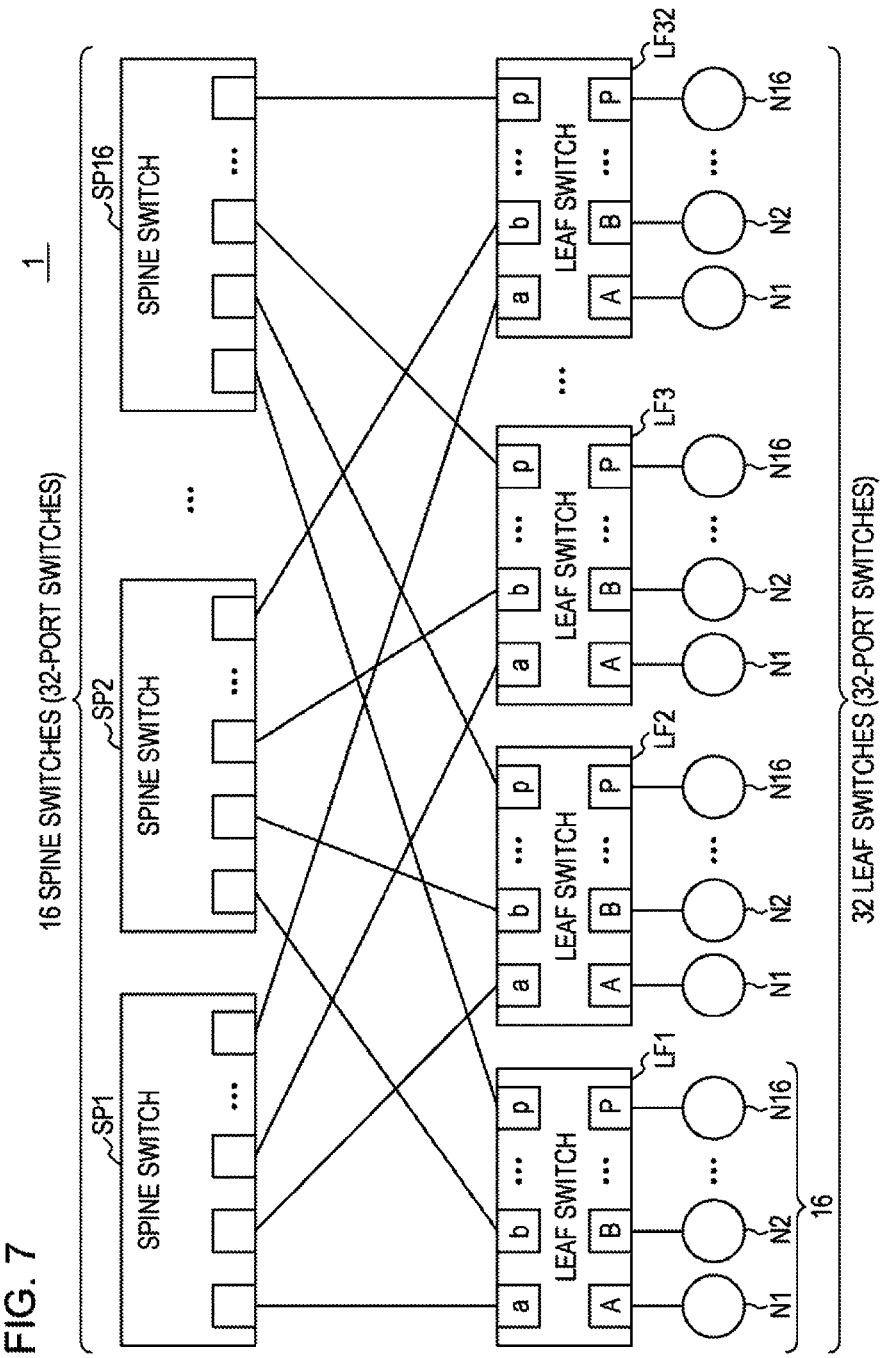
FIG. 7 is a diagram illustrating a configuration example of a network system, according to a first embodiment.

FIG. 7 is a diagram illustrating a configuration example of a network system, according to a first embodiment.

The network system 1 in FIG. 7 includes 16 spine switches SP (SP1 to SP16), 32 leaf switches LF (LF1 to LF32), and 16 compute nodes (end nodes) for each leaf switch (512 compute nodes in total). Spine switches SP1 to SP16, leaf switches LF1 to LF32, and compute nodes N1 to N16 are coupled via a network so as to form a fat tree. In a fat tree, switch layers are connected in a tree topology so that switches at an upper layer are equally and symmetrically connected to switches at a lower layer. A plurality of switches at the top layer are placed in parallel without being connected with each other.

The compute nodes are computers that communicate with each other via leaf switches LF1 to LF32 and spine switches SP1 to SP16, and perform prescribed operations. In FIG. 7, reference characters N1 to N16 that are assigned to the compute nodes directly connected to their relevant leaf switches are overlapped each other for ease of explanation. Therefore, two different compute nodes each directly connected to a different leaf switch may be assigned the same reference character. For example, compute node N1 connected to leaf switch LF1 is a compute node different from compute node N1 connected to leaf switch LF2.

Leaf switches LF1 to LF32 are each an InfiniBand switch having 32 ports. In this embodiment, leaf switches LF1 to LF32 are each an example of a switch that is arranged at a lower layer in a network system. Each of leaf switches is coupled to 16 spine switches SP1 to SP16, and directly connected to 16 compute nodes N1 to N16. The letters "a" to "p" and "A" to "P" assigned to ports of each leaf switch indicate port numbers. Although a port number is in general expressed as a numerical symbol, In FIG. 7, port numbers are represented using alphabetical letters for ease of explanation. Further, in this embodiment, it is assumed that port numbers are assigned in a leaf switch in the order of A to P and "a" to "p". That is, port number P is followed by port number Spine switches SP1 to SP16 are InfiniBand switches that couple leaf switches LF1 to LF32 each other. That is, when each of leaf switches LF1 to LF32 receives a packet (communication data) that is not destined for a compute node directly connected to the each leaf switch, the packet is forwarded to the compute node for which the received packet is destined, via one of spine switches SP1 to SP16. In this embodiment, each of spine switches SP1 to SP16 is an example of a switch arranged at a top layer in a fat tree.

Spine switches SF1 to SF16 and leaf switches LF1 to LF32 (also referred to below as simply switches when they do not need to be distinguished) each have a forwarding database (FDB) in a memory to manage route information. The route information indicates correspondence between an address assigned to a compute node and a port number of a switch.

FIG. 7 is a diagram illustrating an example of a setting status of a network system before the operation of the network system is started. Therefore, the addresses (serving as local identifiers) of compute nodes N1 to N16 have not been determined (assigned) yet, and route information has not been set in each switch yet. In the InfiniBand network system, addresses are assigned to the compute nodes and route information is set to the switches when the operation of the system is started.

In this embodiment, information processing apparatus 10 assigns addresses to the compute nodes, and sets route information to the switches. Information processing apparatus 10 may be implemented as any one of spine switches SP1 to SP16 and leaf switches LF1 to LF32, or as any one of the compute nodes in the network system 1. Alternatively, information processing apparatus 10 may be implemented as a computer that is coupled to the network system 1 via a network.

Figure 8:
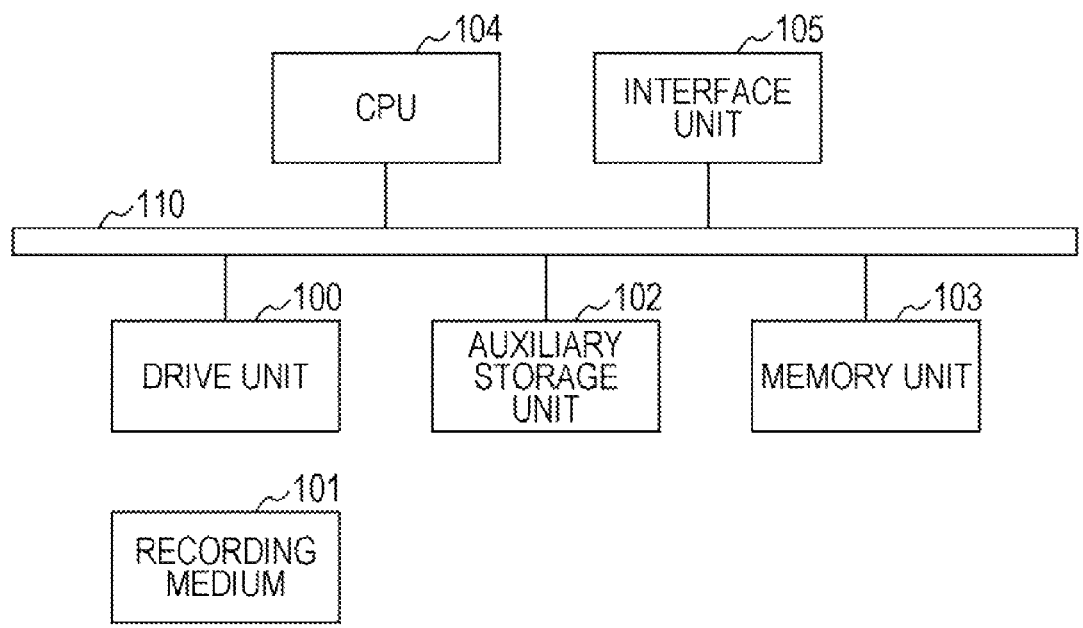
FIG. 8 is a diagram illustrating an example of a hardware configuration of information processing apparatus, according to an embodiment.

FIG. 8 is a diagram illustrating an example of a hardware configuration of information processing apparatus, according to an embodiment. Information processing apparatus 10 of FIG. 8 includes a drive unit 100, an auxiliary storage unit 102, a memory unit 103, a central processing unit (CPU) 104, and an interface unit 105, which are connected with each other via a bus 110.

A program that implements processes executed by the information processing apparatus 10 may be provided in the form of recording medium 101. When recording medium 101 is set in drive unit 100, the program is installed from the recording medium 101 into auxiliary storage unit 102 via drive unit 100. However, the program does not necessarily have to be installed from recording medium 101; the program may be downloaded from another computer through a network. Alternatively, the program may be recorded in auxiliary storage unit 102 in advance at a factory before information processing apparatus 10 is shipped. Therefore, information processing apparatus 10 does not necessarily have to include drive unit 100.

Auxiliary storage unit 102 stores the installed program and also stores necessary files, data, and the like. Memory unit 103 loads the program from auxiliary storage unit 102 and to hold the program, in response to a command to start the program. CPU 104 executes functions related to information processing apparatus 10 according to the program held in memory unit 103. Interface unit 105 is used for connection to a network.

Examples of recording medium 101 include a compact disc-read-only memory (CD-ROM), a digital versatile disk (DVD), a universal serial bus (USB) memory, and other portable storage media. Examples of the auxiliary storage unit 102 include a hard disk drive (HDD) and a flush memory. Here, each of recording medium 101 and auxiliary storage unit 102 is a type of computer-readable storage medium.

Figure 9:
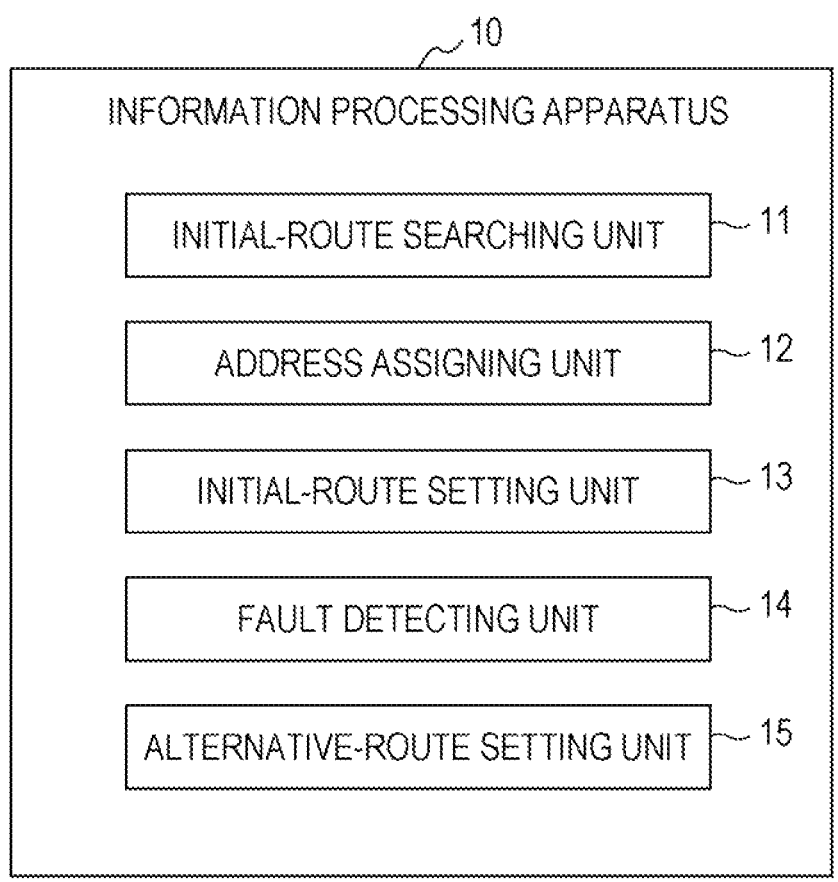
FIG. 9 is a diagram illustrating an example of a functional structure of an information processing apparatus, according to an embodiment.

FIG. 9 is a diagram illustrating an example of a functional structure of an information processing apparatus, according to an embodiment. Information processing apparatus 10 of FIG. 9 includes initial-route searching unit 11, address assigning unit 12, initial-route setting unit 13, fault detecting unit 14, and alternative-route setting unit 15. These units are implemented as the processes that are operated by CPU 104 executing the programs installed in information processing apparatus 10. The programs may be installed, for example, as a component of software called a subnet manager in the InfiniBand specification.

Initial-route searching unit 11, for example, searches for an available route when the operation of network system 1 is started (initialized). Address assigning unit 12 assigns an address to each of the compute nodes. Initial-route setting unit 13 sets route information about initial routes to each of the leaf switches and spine switches. In the case, the route information is stored into the forwarding database (FDB) of each of the switches.

Fault detecting unit 14 detects a fault that has occurred in network system 1. For example, fault detecting unit 14 detects a fault that has occurred in a spine switch. Alternative-route setting unit 15 searches for an alternative route according to a faulty point that has been detected by fault detecting unit 14, and sets route information on the alternative route to each of the leaf switches and spine switches.

Next, an operational procedure executed by the information processing apparatus 10 will be described below.

Figure 10:
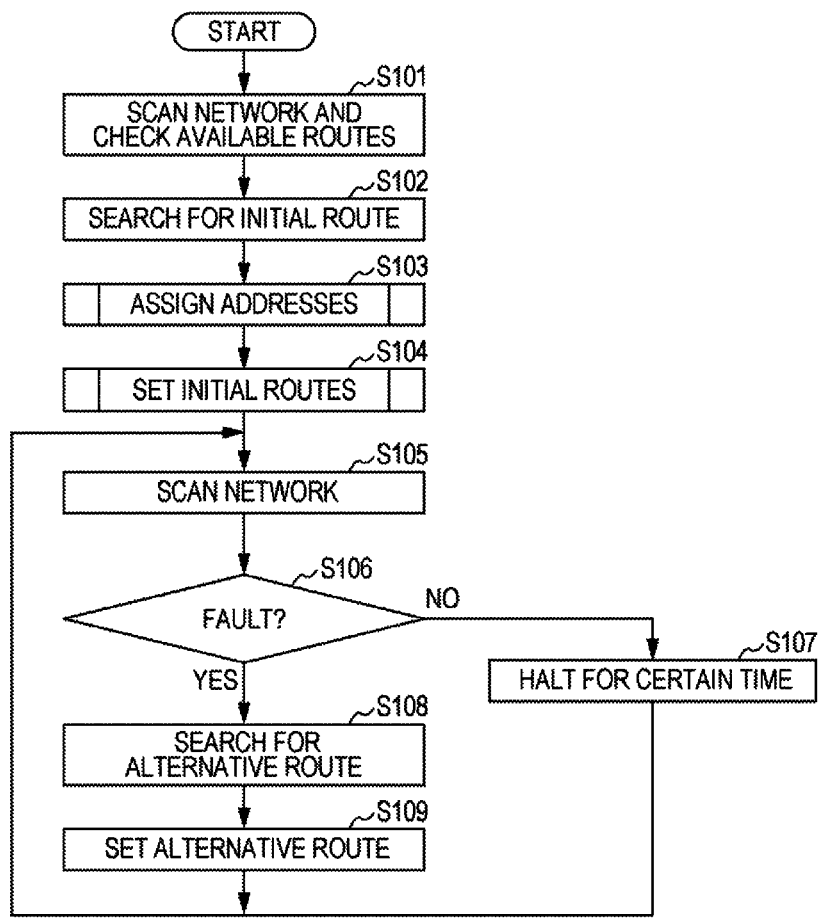
FIG. 10 is a diagram illustrating an example of an operational flowchart performed by an information processing apparatus, according to an embodiment.

FIG. 10 is a diagram illustrating an example of an operational flowchart performed by an information processing apparatus, according to an embodiment.

In operation S101, when the operation of network system 1 is started, initial-route searching unit 11 scans routes in network system 1, and determines routes that are available at present.

In operation S102, initial-route searching unit 11 searches for an initial route based one the determined available routes. Here, known technology may be used to determine the available nodes and search for the initial route.

In operation S103, address assigning unit 12 assigns an address to each of the compute nodes.

In operation S104, initial-route setting unit 13 sets route information about the initial route to each of the leaf switches and spine switches.

The initial setting for network system 1 is completed when operation S104 is performed. As a result, the compute nodes become able to perform operations by communicating with each other. That is, network system 1 becomes ready to operate.

In operation S105, while network system 1 is being operated, fault detecting unit 14 periodically scans routes in network system 1 to monitor whether there exists a fault occurring or not (in operation S106). When no faults are detected (NO in operation S106), the operational sequence proceeds to operation S107. Here, network system 1 may be configured so that when a fault has occurred, information processing apparatus 10 is notified of information on the faulty point by the switch in which the fault has occurred or by the other switches.

When a fault is detected (YES in operation S106), alternative-route setting unit 15 searches the routes defined in the route information being set in network system 1, for an alternative route to bypass the route passing through the faulty point (in operation S108). Here, known technology may be used to search for an alternative route. For example, an appropriate alternative route may be searched for in view of load distribution.

In operation S109, alternative-route setting unit 15 sets new route information related to the searched-for alternative route to each of the switches. Here, known technology may be used for setting the alternative route. Next, operation S103 will be described in detail.

Figure 11:
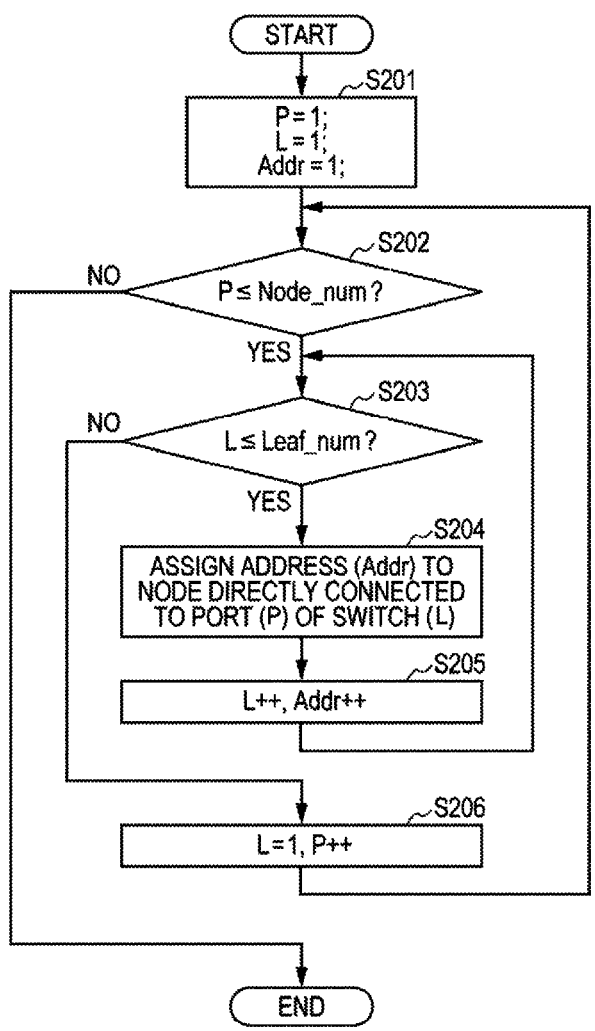
FIG. 11 is a diagram illustrating an example of an operational flowchart for assigning addresses to compute nodes, according to an embodiment.

FIG. 11 is a diagram illustrating an example of an operational flowchart for assigning addresses to compute nodes, according to an embodiment.

In operation S201, address assigning unit 12 initializes the values of variables P, L, and Addr at 1. Variable P indicates a port number assigned to a target port that is to be currently processed. Variable L indicates a leaf-switch number assigned to a target leaf switch that is to be currently processed. The leaf-switch numbers are defined as consecutive numbers assigned to the leaf switches. The order of the consecutive numbers may be set arbitrarily by the address assigning unit 12, or may be set at a predetermined order in advance. Variable Addr indicates an address to be assigned to a target compute node that is to be currently processed.

In operation S202, address assigning unit 12 determines whether the value of variable P is equal to or smaller than the value of constant "Node_num". Constant Node_num indicates the number of compute nodes directly connected to one leaf switch. In the first embodiment, the value of constant Node_num is 16 as illustrated in FIG. 7. That is, in operation S202, it is determined whether there exists a port directly connected to a compute node left in the target leaf switch (identified by variable L), for which operations S203 and the subsequent operations have not been performed yet.

When the value of variable P is equal to or smaller than the value of constant Node_num (that is, there exists a port left for which operations S203 and the subsequent operations have not been performed yet) (YES in operation S202), address assigning unit 12 further determines whether the value of variable L is equal to or smaller than the value of constant "Leaf_num" (in operation S203). Constant Leaf_num indicates the number of leaf switches to be processed. In the first embodiment, the value of constant Leaf_num is 32 as depicted in FIG. 7. That is, in operation S203, it is determined whether there exists a leaf switch left for which operations S204 and S205 have not been performed yet.

When the value of variable L is equal to or smaller than the value of constant Leaf_num (that is, there exists a leaf switch left for which operations S204 and S205 have not been performed yet) (YES in operation S203), address assigning unit 12 performs operations S204 and S205.

In operation S204, address assigning unit 12 assigns the current value of variable Addr, as an address, to a compute node directly connected to the P-th port of the L-th lead switch, where "P" represents the value of variable P and "L" represents the value of variable L. That is, information indicating correspondence between the current value of variable Addr and the compute node directly connected to the P-th port of the L-th lead switch is stored in memory unit 103. Here, a compute node may be notified that the current value of variable Addr has been assigned as the address (LID) of the compute node.

For example, when operation S204 is executed for the first time, each value of variables P, L, and Addr is 1. Therefore, in this case, value 1 is assigned, as an address, to compute node N1 directly connected to port A (a port having port number A) of leaf switch LF1 in FIG. 7.

In operation S205, address assigning unit 12 adds 1 to each of the variables L and Addr. That is, a next leaf switch becomes a next target leaf switch to be next processed, and variable Addr is incremented by one so that consecutive addresses are assigned to compute nodes directly connected to ports having the same port number.

Operations S204 and S205 are repeated until all the leaf switches have been processed while variable P is being kept at the same value. For example, when the value of variable P is 1, consecutive addresses are assigned to the compute nodes each directly connected to a port that has port number 1 and is provided for different one of all the leaf switches. That is, for the same port number, consecutive addresses are assigned to a set of compute nodes each directly connected to a port that has the same port number and is provided for different one of all the leaf switches. Further, in the case, consecutive addresses are assigned to a pair of computer node sets corresponding to any pair of adjacent port numbers. As a result, consecutive addresses are assigned to all the compute nodes in the order of port numbers assigned to ports directly connected to the compute nodes.

When the value of variable L exceeds constant Leaf_num, that is, when operations S204 and S205 have been done for all the leaf switches (NO in operation S203), address assigning unit 12 initializes variable L at value 1 and adds 1 to variable P (in operation S206). Address assigning unit 12 then repeats operation S202 and the subsequent operations. That is, addresses are sequentially assigned to the compute nodes directly connected to the P-th port in all the leaf switches.

Figure 12:
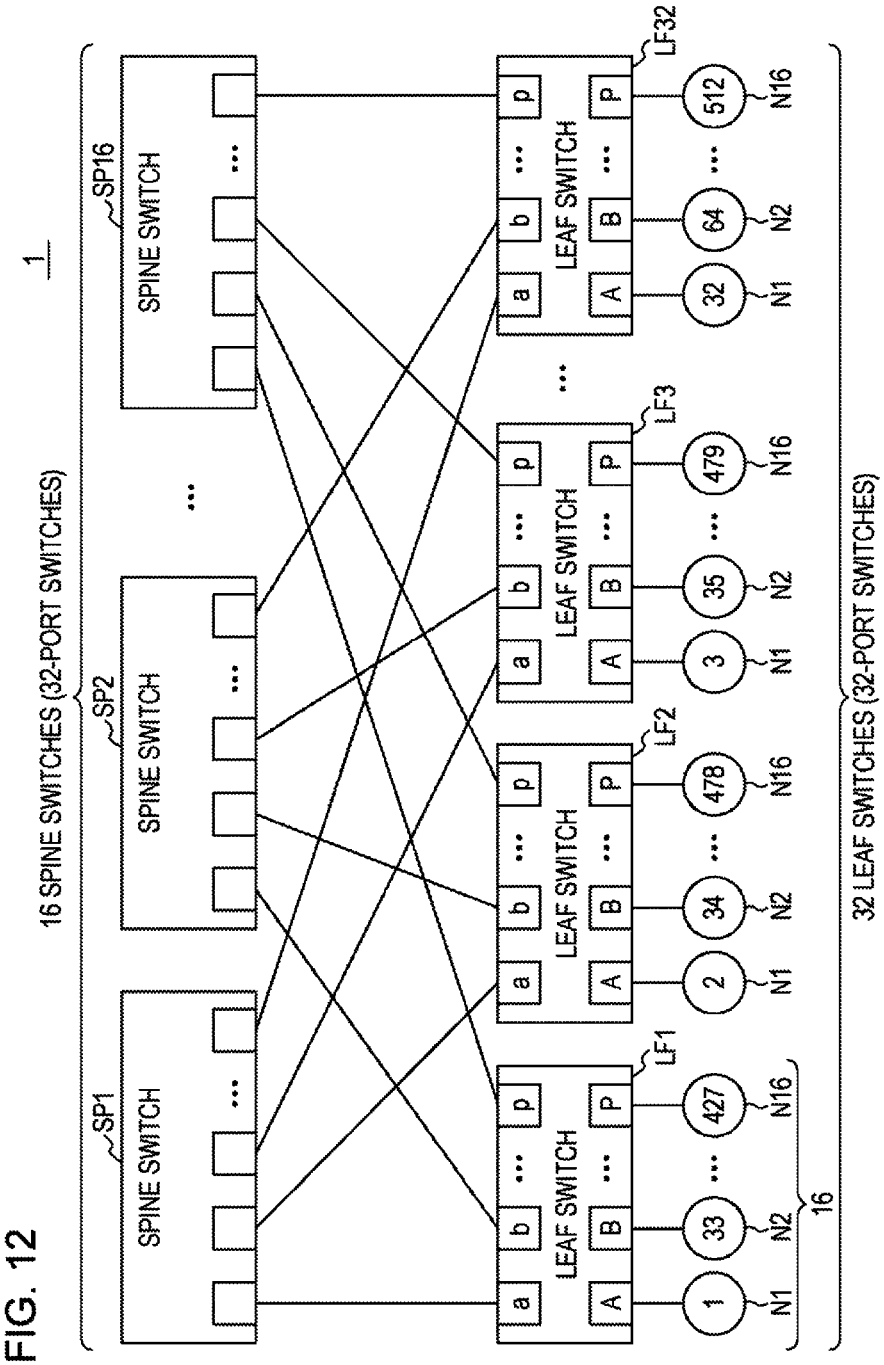
FIG. 12 is a diagram illustrating an example of a state of a network system, according to an embodiment.

After the operations of FIG. 11 have been performed, the setting status of network system 1 in FIG. 7 becomes as illustrated in FIG. 12.

FIG. 12 is a diagram illustrating an example of a setting status of a network system, according to an embodiment. The example of FIG. 12 indicates the setting status of a network system in which addresses have been assigned to the compute nodes according to a first embodiment. The same elements in FIG. 12 as in FIG. 7 are denoted by the same reference characters, and the description thereof will be omitted here.

Unlike FIG. 7, a number is described in a circle corresponding to each of the compute nodes in FIG. 12, where the number indicates the address assigned to the each compute node.

As is seen from FIG. 7, consecutive addresses are assigned to the compute nodes directly connected to ports having the same port number in all the leaf switches. For example, the addresses assigned to compute nodes directly connected to ports having port number A are 1 to 32. Similarly, the addresses assigned to compute nodes directly connected to ports having port number B are 33 to 64. Next, operation S104 of FIG. 10 will be described in detail.

Figure 13:
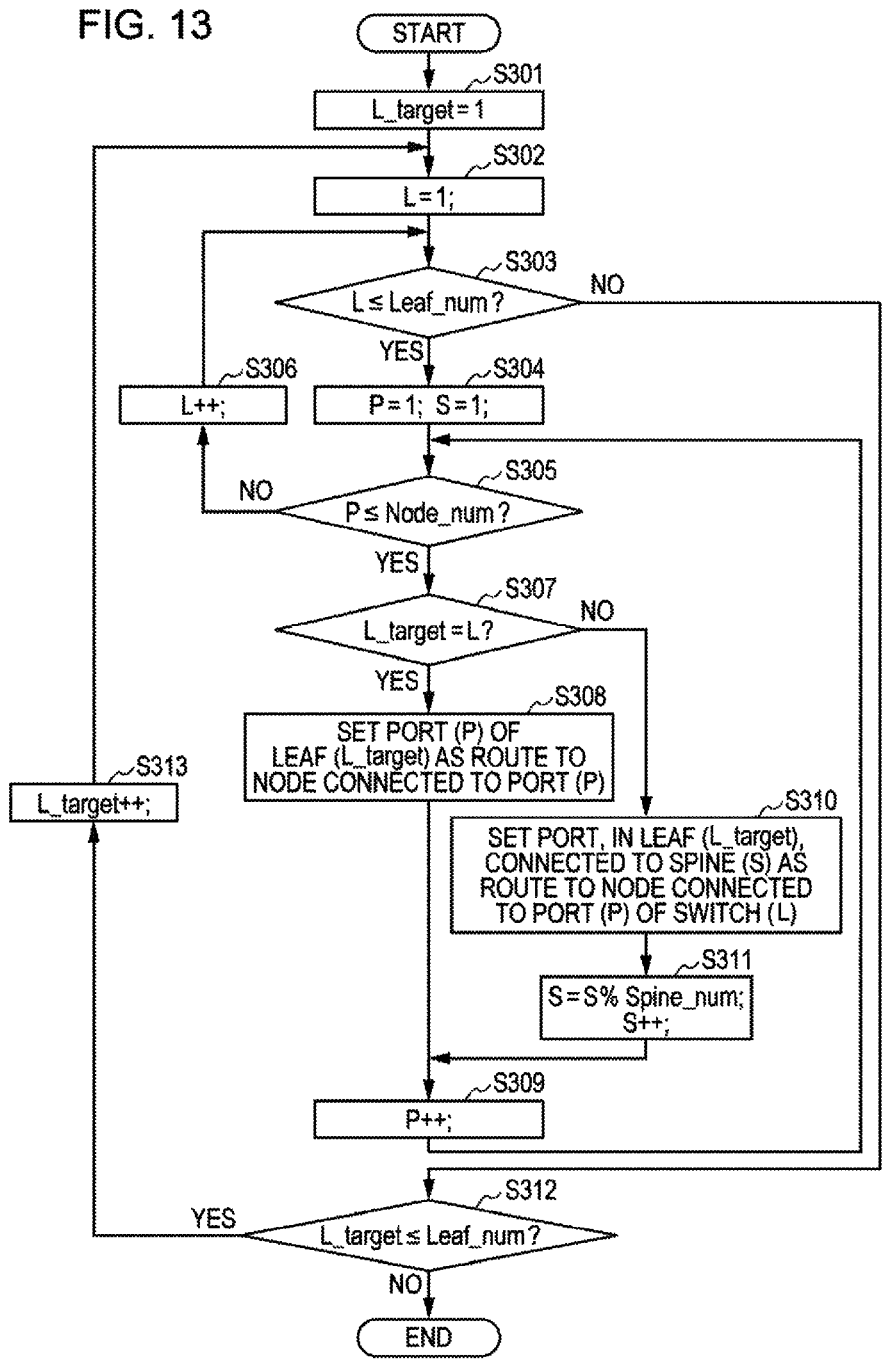
FIG. 13 is a diagram illustrating an example of an operational flowchart for setting route information to each of leaf switches, according to an embodiment.

FIG. 13 is a diagram illustrating an example of an operational flowchart for setting route information to each of leaf switches, according to an embodiment, which is performed when setting initial communication routes.

In operation S301, initial-route setting unit 13 initializes variable L_target at the value 1. Variable L_target indicates a leaf-switch number assigned to a first leaf switch to which the route information is to be set.

In operation S302, initial-route setting unit 13 initializes variable L to the value 1. Here, variable L indicates a leaf-switch number assigned to a second leaf switch on which a piece of the route information is to be currently defined as a part of the route information.

In operation S303, initial-route setting unit 13 determines whether the value of variable L is equal to or smaller than constant "Leaf_num", where constant Leaf_num is the same as that described with reference to FIG. 11. When the value of variable L is equal to or smaller than the value of constant Leaf_num (YES in operation S303), initial-route setting unit 13 initializes variables P and S at the value 1 (in operation S304). Here, variable P indicates a port number that is assigned to a target port to be currently processed in the leaf switch identified by the value of variable L. Variable S indicates a spine switch number that is assigned to a target spine switch to be currently processed. In the case, for example, consecutive numbers may be assigned to spine switches in the arrangement order of the spine switches.

In operation S305, initial-route setting unit 13 determines whether the value of variable P is equal to or smaller than constant "Node_num", where constant Node_num is the same as that described with reference to FIG. 11. When the value of variable P is equal to or smaller than the value of constant Node_num (YES in S305), initial-route setting unit 13 further determines whether the value of variable L_target matches the value of variable L (in operation S307). That is, it is determined whether the first leaf switch to which the route information is to be set matches the second leaf switch on which a piece of route information is to be currently defined as a part of the route information.

When the first leaf switch matches the second leaf switch (YES in operation S307), initial-route setting unit 13 sets the P-th port of the first leaf switch as a route to the compute node directly connected to the P-th port (in operation S308). That is, information indicating correspondence between port number P assigned to the P-th port and the address assigned to a compute node directly connected to the P-th port is set in the FDB of the L_target-th leaf switch. For example, in FIG. 12, information indicating correspondence between the address assigned to compute node N1 directly connected to port A (a port having port number A) of leaf switch LF1 and port number A assigned to port A of leaf switch LF1 is set in the FDB of leaf switch LF1.

In operation S309, initial-route setting unit 13 adds 1 to variable P, and repeats operation S305 and the subsequent operations. As a result, information indicating correspondence between an address of each of the compute nodes directly connected to the L_target-th leaf switch and a port number assigned to the port to which the each of the compute nodes is directly connected is set in the FDB of a leaf switch identified by variable L_target.

Meanwhile, when the value of variable P exceeds constant Node_num (NO in operation S305), initial-route setting unit 13 adds 1 to variable L (in operation S306), and performs operation S303 and the subsequent operations. As a result, a difference is caused between the value of variable L_target and the value of variable L in operation S307. For example, the first leaf switch, to which the route information is to be set, is leaf switch LF1 but the second switch, on which a piece of the route information is to be currently defined as a part of the route information, becomes leaf switch LF2. In this case (NO in operation S307), initial-route setting unit 13 sets, in the L_target-th leaf switch (the first leaf switch), a port connected to the S-th spine switch as a route to the destination compute node that is directly connected to the P-th port of the L-th leaf switch (the second leaf switch different from the first switch)

(in operation S310). That is, information indicating correspondence between a port number assigned to the port coupled to the S-th spine switch and an address assigned to the destination compute node is set in the FDB of the L_target-th leaf switch (the first switch). For example, in FIG. 12, information indicating correspondence between an address assigned to compute node N1 directly connected to port A of leaf switch LF2 and a port number "a" assigned to a port having port number "a" in leaf switch LF1 is set, as route information, in the FDB of leaf switch LF1.

In operation S311, initial-route setting unit 13 substitutes the remainder obtained by dividing the value of variable S by the value of constant Spine_num into variable S, and further adds 1 to variable S. Constant Spine_num indicates the number of spine switches, and, in this embodiment, the value of constant Spine_num becomes 16. Here, the remainder obtained by dividing the value of variable S by the value of constant Spine_num is substituted into variable S so that the value of variable S cyclically increments within a value range from 1 to Spine_num.

In operation S309, initial-route setting unit 13 adds 1 to variable P, and repeats operation S305 and the subsequent operations. As a result, the information indicating correspondence between ports having port numbers "a" to "p", in the L_target-th leaf switch, coupled to the spine switches and the compute nodes directly connected to leaf switches other than the L-target-th leaf switch is set, as route information, in the FDB of the L_target-th leaf switch.

In operation S312, when whole the route information has been set in the FDB of the L_target-th leaf switch and the value of variable L_target is equal to or smaller than the value of constant Leaf_num (YES in operation S312), initial-route setting unit 13 adds 1 to variable L_target, and repeats operation S302 and the subsequent operations. As a result, the route information will be set in the FDB of a next leaf switch. When route information has been set for all the leaf switches (NO in operation S312), the operations depicted in FIG. 13 are completed.

Figure 14:
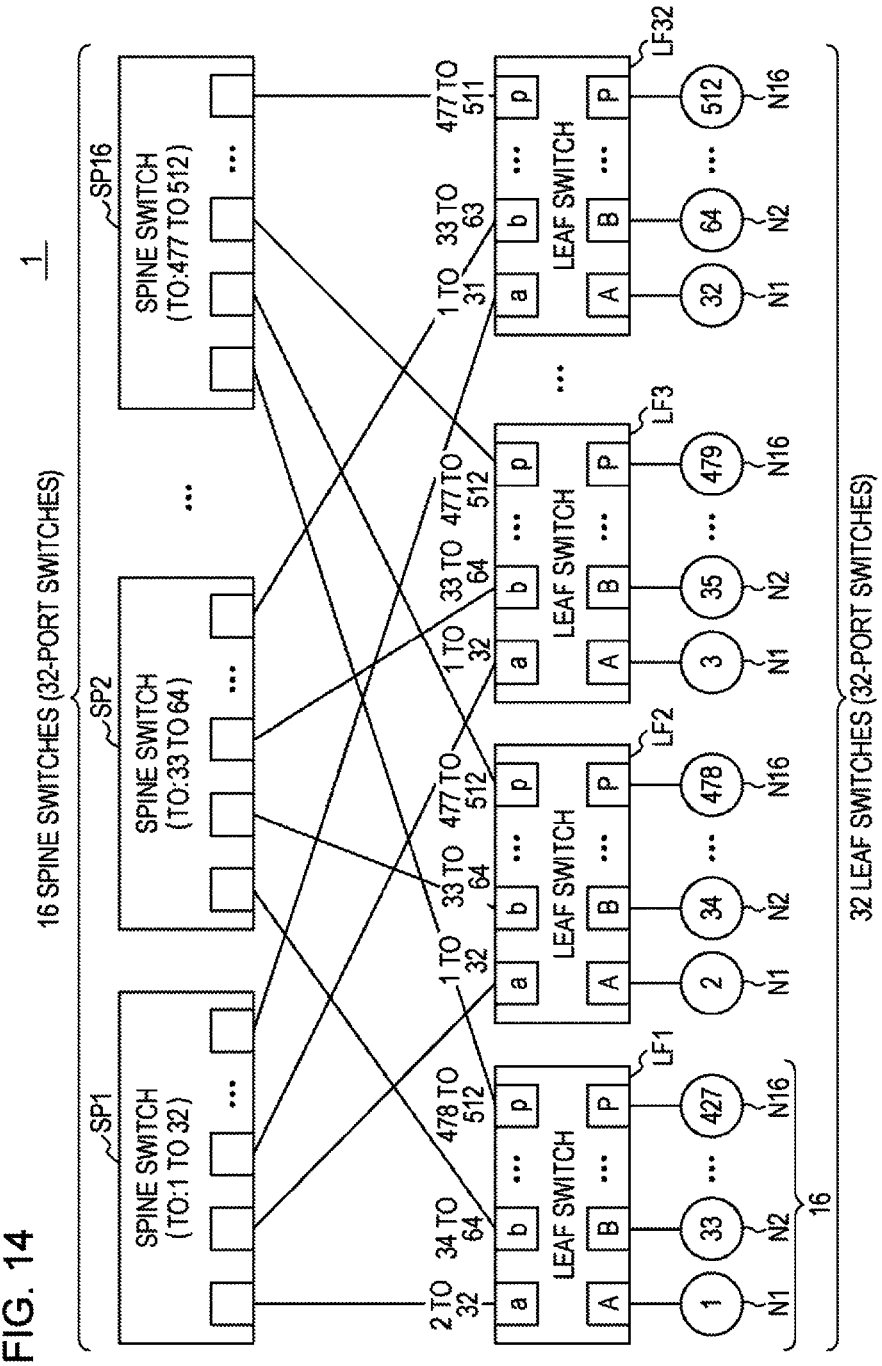
FIG. 14 is a diagram illustrating an example of a state of a network system, according to an embodiment.

In the first embodiment, after route information has been set in all the leaf switches as illustrated in FIG. 13, the setting status of network system 1 becomes as illustrated in FIG. 14. The same elements in FIG. 14 as in FIG. 12 are denoted by the same reference characters to omit repeated descriptions.

In FIG. 14, numeric values added beside each of ports having port numbers "a" to "p" in each leaf switch are destination addresses associated with the each port. However, for ports that have port numbers A to P and are directly connected to compute nodes, destination addresses to be associated with the compute nodes are self-evident (the destination addresses become the addresses assigned to the compute nodes), and the description of the destination addresses is omitted in FIG. 14.

The destination addresses associated with each of ports that have port numbers "a" to "p" and are coupled to the spine switches are consecutive numbers. For example, in leaf switch LF1, a port having port number "a" is associated with consecutive destination addresses 2 to 32, and a port having port number "b" is associated with consecutive destination addresses 34 to 64. Each of ports having port numbers "a" to "p" in other leaf switches may be similarly associated with consecutive destination addresses.

As a result, for example, route information is set to the FDB in each leaf switch as illustrated in FIG. 15.

FIG. 15 illustrates an example of route information being set in a FDB of a leaf switch, according to a first embodiment.

In the FDB of FIG. 15, characters "a" to "p" indicate port numbers, and an address of a compute node associated with a port number is identified by adding the corresponding value in the row labeled with "OFFSET" to the corresponding value in the column labeled with "BASE". For example, the FDB in FIG. 15 indicates that a packet having a destination address of 1(0+1) should be sent from a port having port number "a". Similarly, it is found that a packet having a destination address of 64 (64+0) should be sent from a port having port number "b". Although the FDB may be configured as one-dimensional information, FIG. 15 two-dimensionally represents the FDB to facilitate understanding.

In a leaf switch, since consecutive addresses are associated with each of ports that have port numbers "a" to "p" and are coupled to the spine switches, the same port number is stored in each of consecutive areas in the FDB as depicted in FIG. 15. For example, after port number "a" has been consecutively stored, port number "b" is consecutively stored. That is, the same port number is stored for each of a plurality of consecutive addresses in one or more data blocks. As a result, when a fault has occurred in any one of the spine switches, a time taken to update the FDB for setting an alternative route may be reduced.

Figure 1:
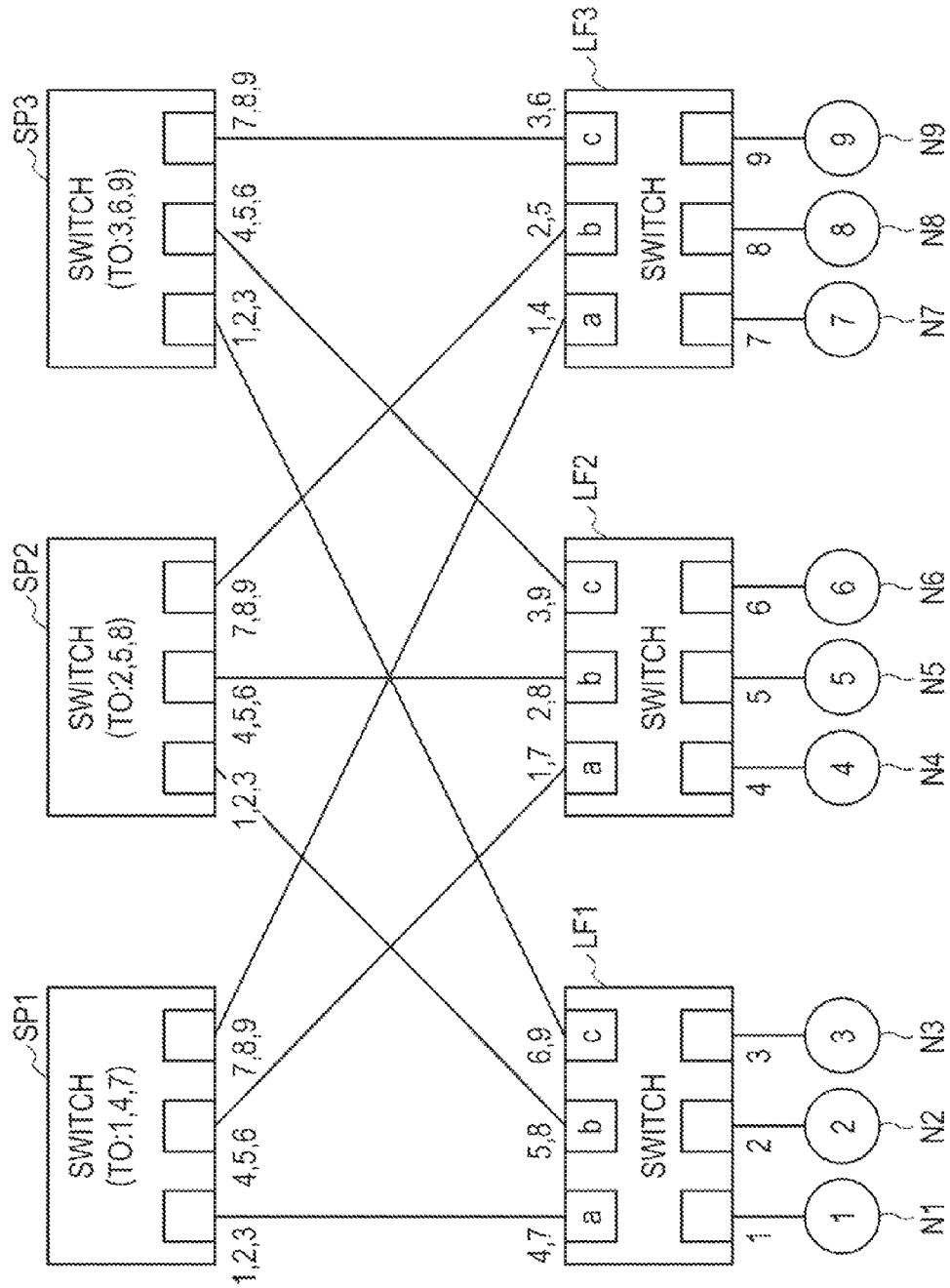
FIG. 1 is a diagram illustrating an example of an InfiniBand network system having a fat-tree structure.
Figure 2:
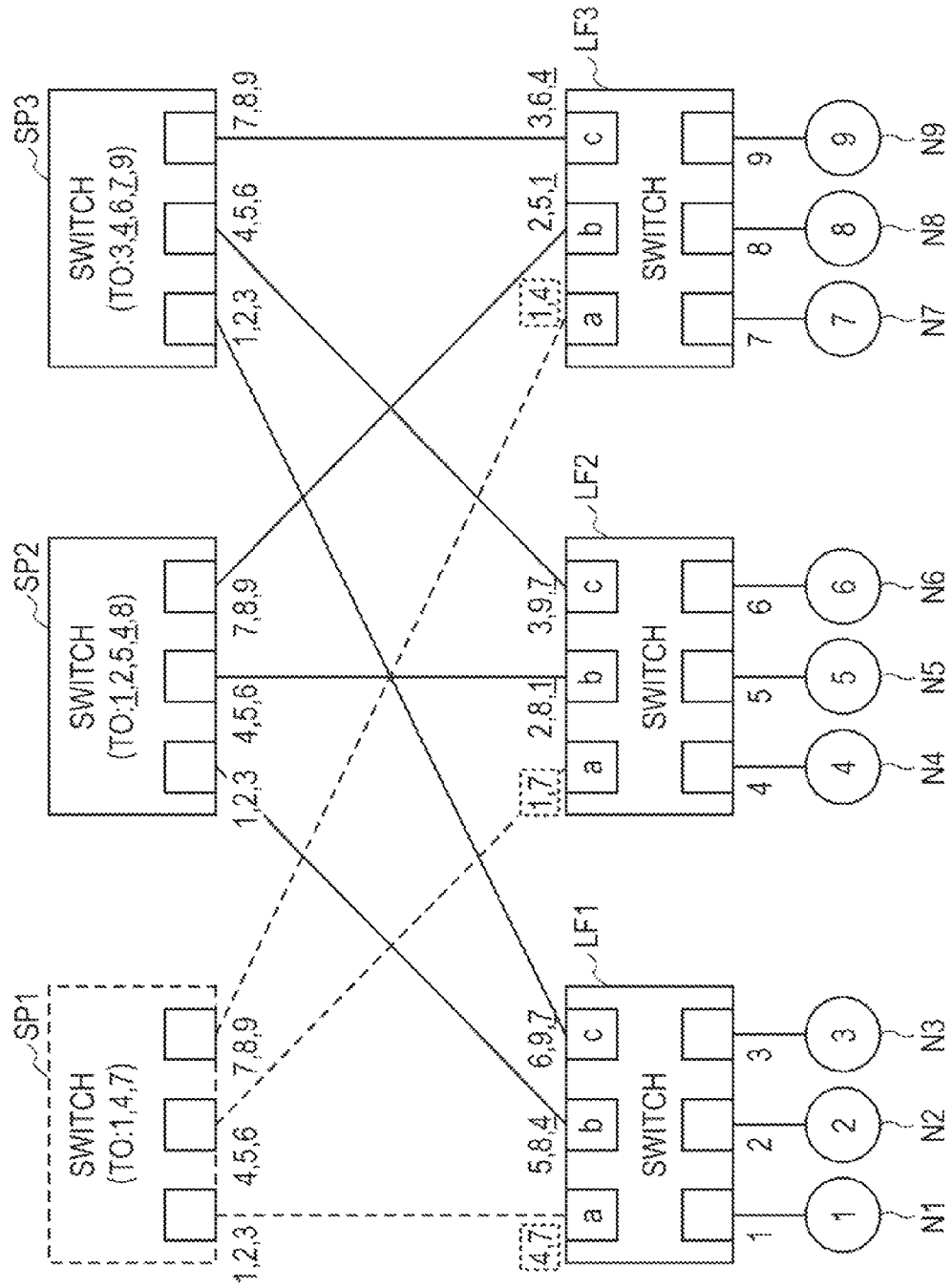
FIG. 2 is a schematic diagram illustrating an example of a route switchover when a spine switch has failed.
Figure 3:
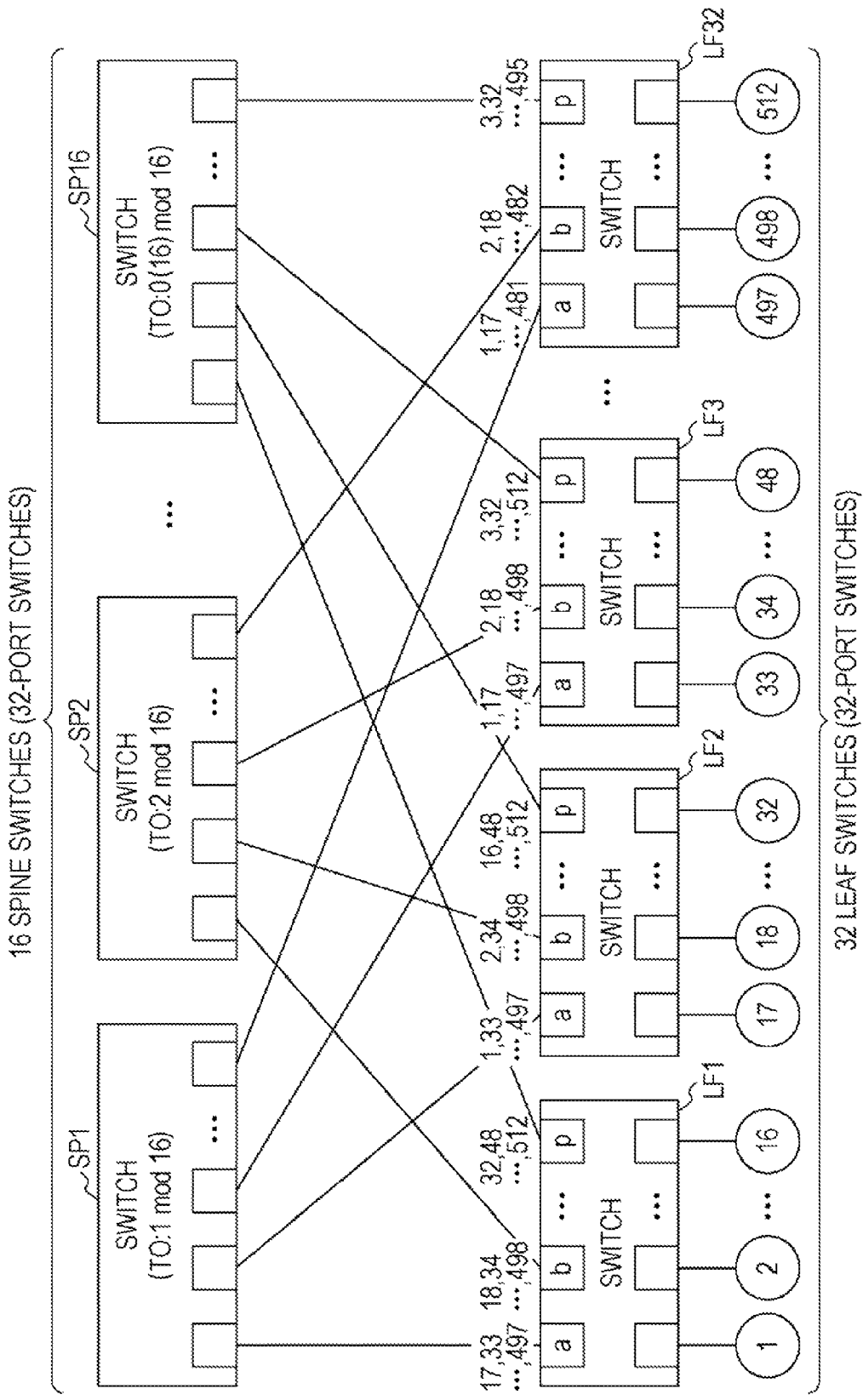
FIG. 3 is a diagram illustrating an example of an InfiniBand network system having a fat-tree structure.
Figure 4:
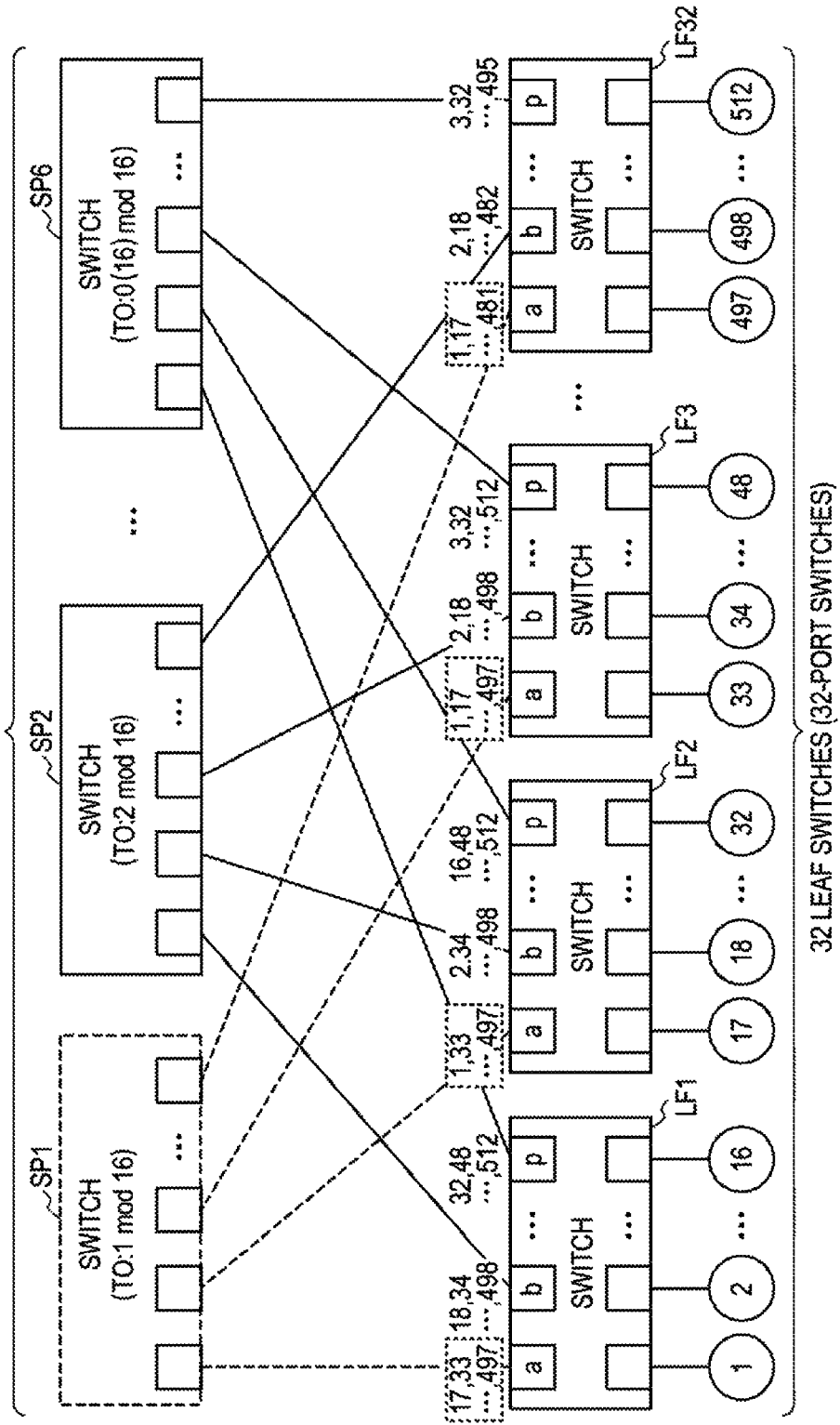
FIG. 4 is a diagram illustrating an example of a route switchover when a switch has failed.
Figure 5:
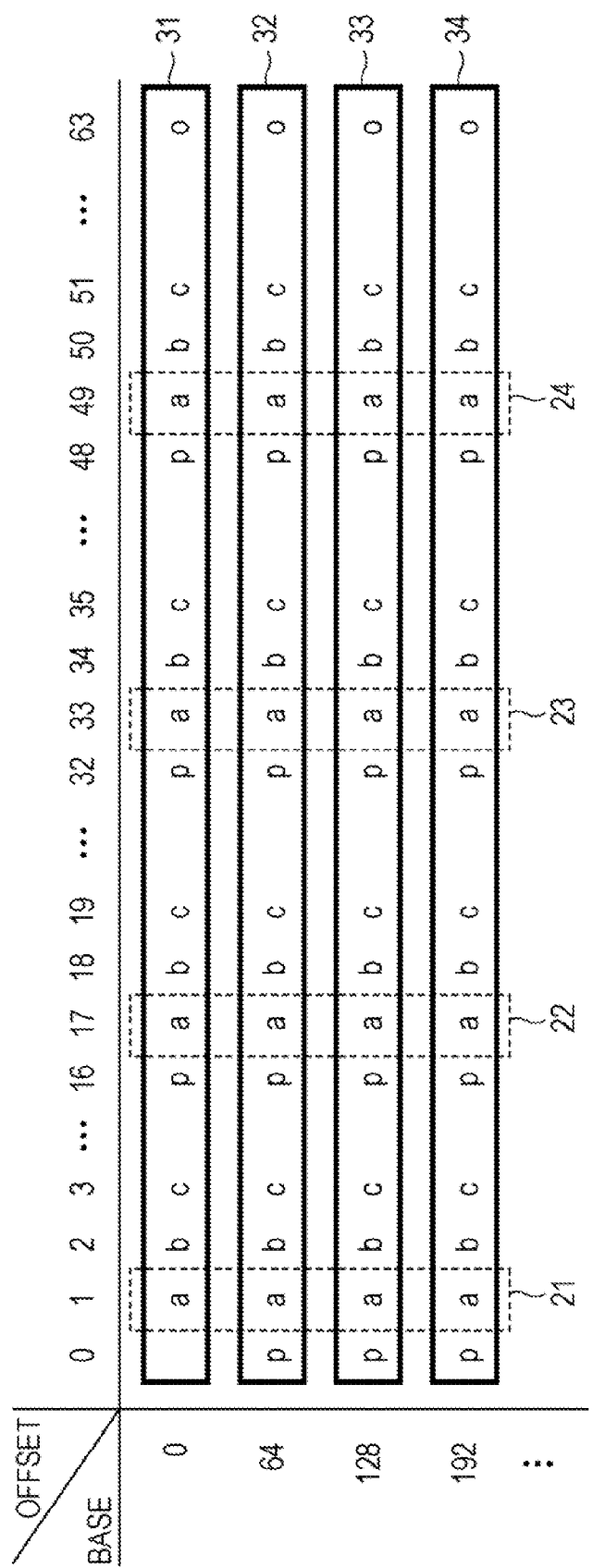
FIG. 5 is a diagram illustrating a configuration example of a FDB included in an InfiniBand switch.
Figure 6:
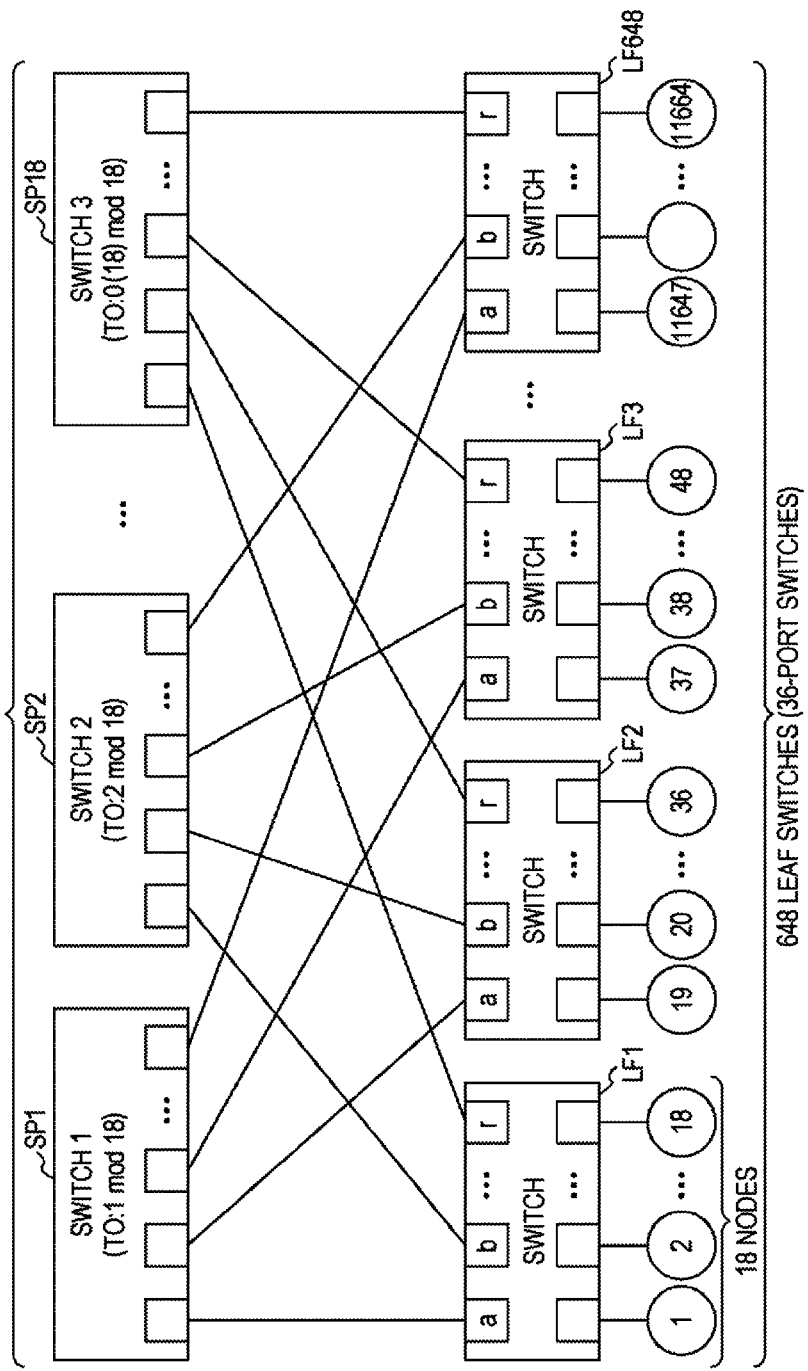
FIG. 6 is a diagram illustrating an example of an InfiniBand network system having a fat-tree structure.

For example, suppose that spine switch SP1 in FIG. 14, which is coupled to each of ports having port number "a", has failed. Then, the FDB needs to be updated for the destination addresses associated with a port having port number "a" in each of leaf switches. In this case, area 41 that is enclosed by the dashed-line rectangle in FIG. 15 is updated. In the Infini-Band specification, since 64 addresses are updated (written) at a time, whole the data in row 51 of FIG. 15 is updated at a time. In the existing known method, all the data blocks need to be updated as described with reference to FIG. 5. Meanwhile, according to the embodiment, the number of data blocks to be updated in the FDB is reduced. As a result, a time taken to update the FDB for setting an alternative route is also reduced.

When a fault has occurred in a spine switch, for each of leaf switches, the use of a port coupled to the faulty spine switch is disabled. According to the embodiment, when an alternative route is being set, each of the addresses that were associated with the disabled port may be reassigned individually to a port other than the disabled port. That is, it is unnecessary to reassign the addresses that have been associated with the same port together to another port. Therefore, in the embodiment, an alternative route may be set with load distribution taken into consideration.

In the FDB of FIG. 15, although destination addresses are arranged in an ascending order, they may be arranged in a descending order. Further, it is unnecessary to arrange destination addresses consecutively, regardless of whether they are arranged in an ascending order or descending order. For example, addresses may be arranged discretely or at random. All that is required is that the port numbers having the same value are recorded in the FDB in association with destination addresses included in the same data block, regardless of arrangement of destination addresses in the FDB. However, it is unnecessary that all the port numbers having the same value are included in the same data block. For example, port numbers having the same value may be stored in one or more data blocks, for example, in two data blocks as in the case of port number "b" in FIG. 15.

That is, when arranging destination addresses in the FDB, it is sufficient to associate port numbers and destination addresses so that port numbers having the same value are stored in consecutive areas, and there is no restriction on the arrangement order of destination addresses.

Next, a second embodiment will be described. Here, only the differences from the first embodiment will be described, and the second embodiment is the same as the first embodiment unless otherwise stated.

Figure 16:
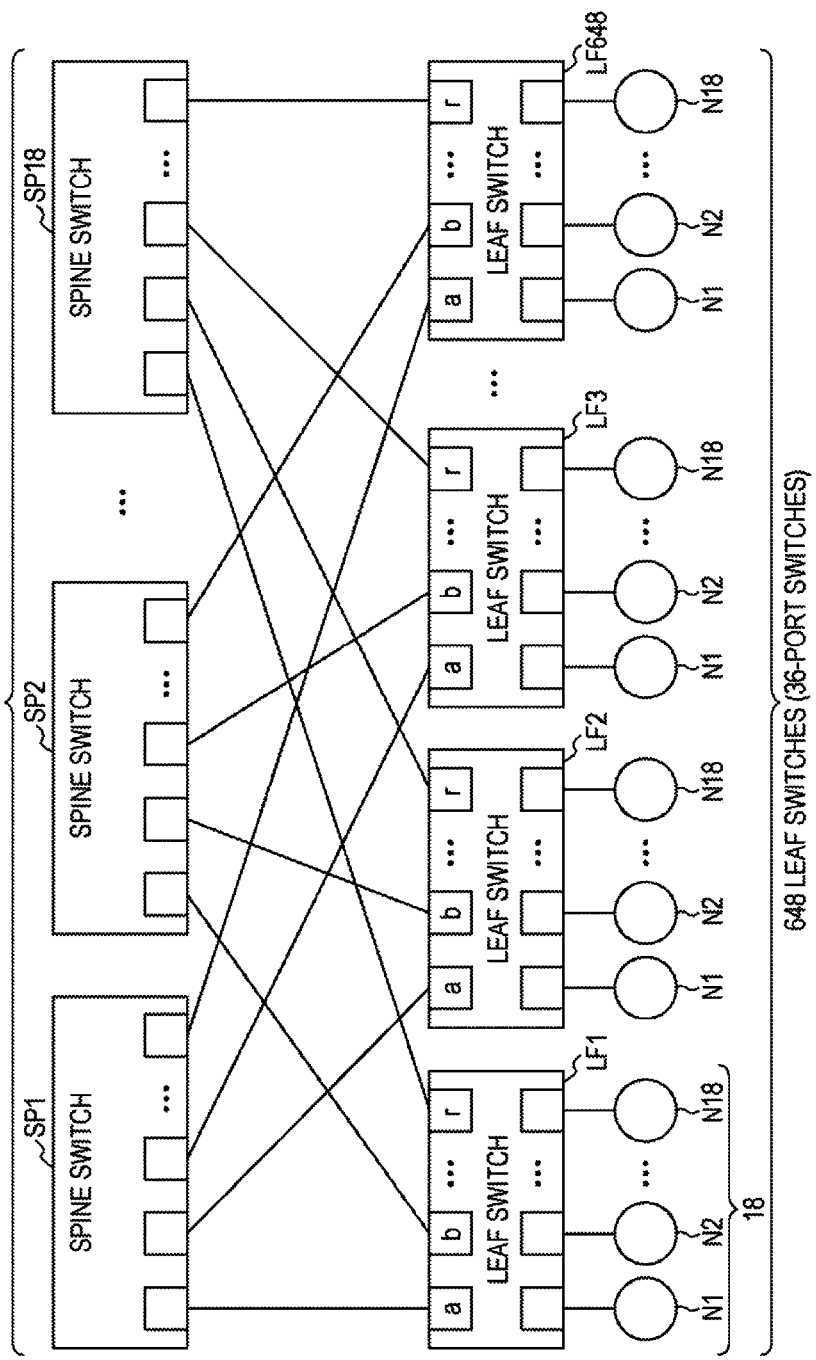
FIG. 16 is a diagram illustrating a configuration example of a network system, according to a second embodiment.

FIG. 16 is a diagram illustrating a configuration example of a network system, according to a second embodiment.

Network system 2 of FIG. 16 includes 18 spine switches SP1 to SP18, 648 leaf switches LF1 to LF648, and 18 compute nodes for each leaf switch (11,664 compute nodes in total). Spine switches SP1 to SP18, leaf switches LF1 to LF648, compute nodes N1 to N18 are coupled via a network to form a fat tree.

Each of spine switches SP1 to SP18 is an InfiniBand switch having 648 ports. Therefore, each spine switch is coupled to 648 leaf switches.

Each of leaf switches LF1 to LF648 is an InfiniBand switch having 36 ports. Of the 36 ports, 18 ports are used for connection to spine switches SP1 to SP18 and the remaining 18 ports are used for connection to compute nodes N1 to N18.

Thus, as described above, network system 2 according to the second embodiment is larger in size than network system 1 according to the first embodiment. However, this does not mean that the second embodiment is not effective in the network system 1. In the second embodiment, network system 2 having a different size than in the first embodiment has been just exemplified to indicate a variation of a network system.

The second embodiment differs from the first embodiment in the processing procedure executed by address assigning unit 12.

Figure 17:
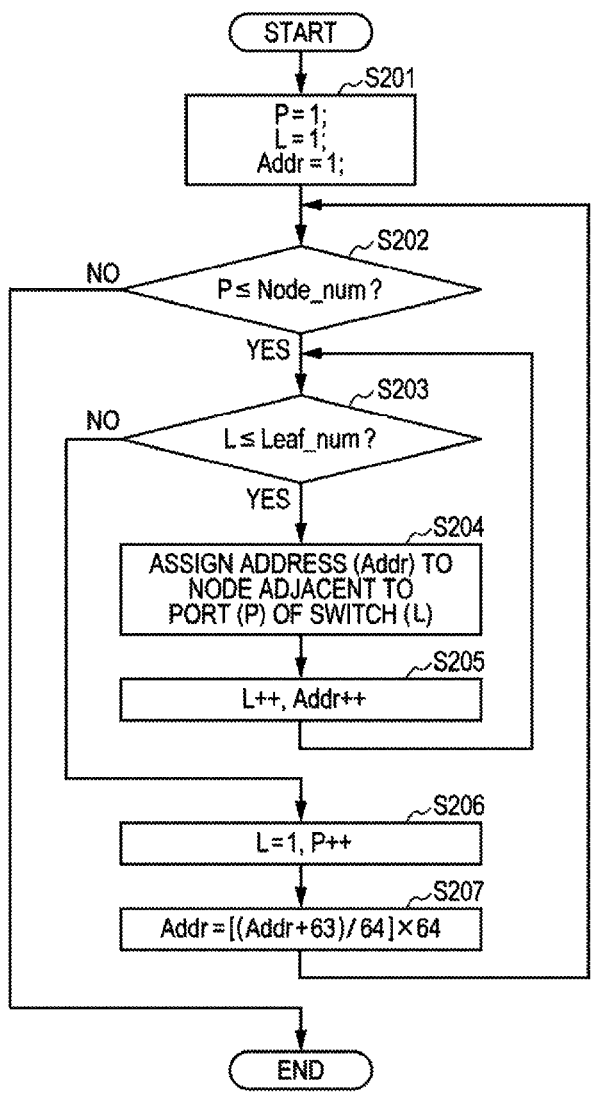
FIG. 17 is a diagram illustrating an example of an operational flowchart for assigning addresses to compute nodes, according to a second embodiment.

FIG. 17 is a diagram illustrating an example of an operational flowchart for assigning addresses to compute nodes, according to a second embodiment. The same elements in FIG. 17 as in FIG. 11 are denoted by the same reference characters to omit repeated descriptions.

In FIG. 17, operation S207 is added in comparison with the operational flowchart of FIG. 11. In operation S207, address assigning unit 12 substitute the operation result obtained from equation (1) below into variable Addr.

$$[(Addr+63)/64] \times 64 \qquad (1)$$

The value enclosed in the angle brackets in equation (1) indicates the maximum integer not exceeding the operation result in the angle brackets. That is, the fractional part of the operation result of $[(Addr+63)/64]$ is truncated. As a result, the operation result of equation (1) becomes a multiple of 64.

That is, operation S207 is a process by which the addresses of the compute nodes directly connected to the second port and the subsequent ports of the first leaf switch (leaf switch LF1) become multiples of 64. The value of 64 is derived from the number of destination addresses that are allowed to be stored in one data block by which the FDB is updated. Therefore, when a different data block is used, the values 63 and 64 in equation (1) may be changed according to the number of addresses allowed to be stored in one data block.

Figure 18:
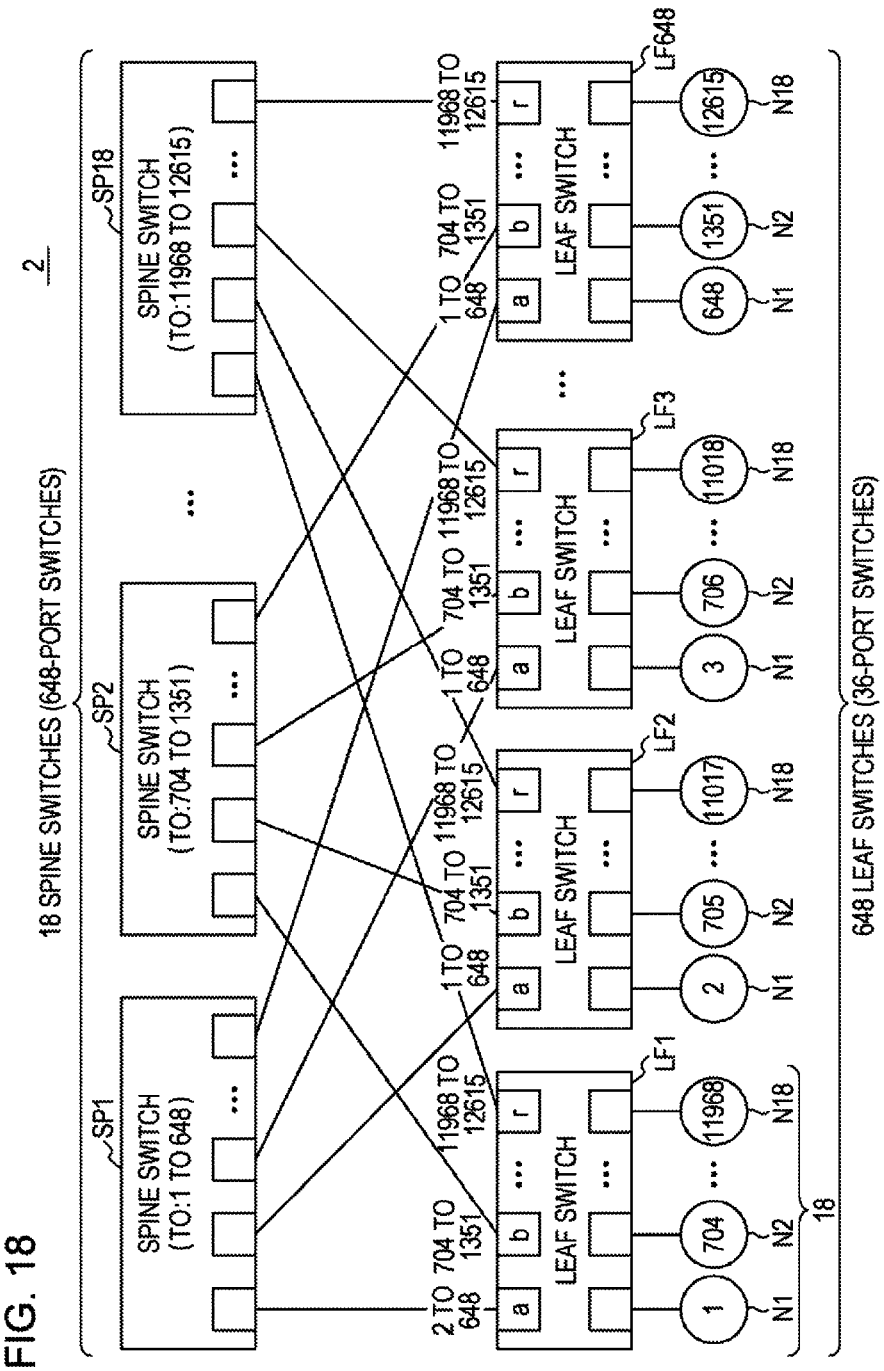
FIG. 18 is a diagram illustrating an example of a state of a network system, according to a second embodiment.

After addresses have been assigned to the compute nodes as illustrated in FIG. 17 and route information has been set in the leaf switches as illustrated in FIG. 13, the setting status of network system 2 becomes as illustrated in FIG. 18.

FIG. 18 is a diagram illustrating an example of a setting status of a network system, according to a second embodiment, in which route information has been set in each of leaf switches.

In FIG. 18, numeric values appended to each of ports having port numbers "a" to "r" in each leaf switch are destination addresses associated with the each port, in the same manner as in FIG. 14. FIG. 18 largely differs from FIG. 14 in that the addresses assigned to the compute nodes are not consecutive in some places. In FIG. 14, the addresses assigned to 512 compute nodes have been consecutive in the range of 1 to 512. However, in FIG. 18, for example, addresses 649 to 703 are not used. This is because the addresses of the compute nodes directly connected to leaf switch LF1 have been adjusted by using equation (1) so that multiples of 64 are assigned to the compute nodes directly connected to leaf switch LF1. As a result, for example, the FDB of each leaf switch is configured as illustrated in FIG. 19.

Figure 19:
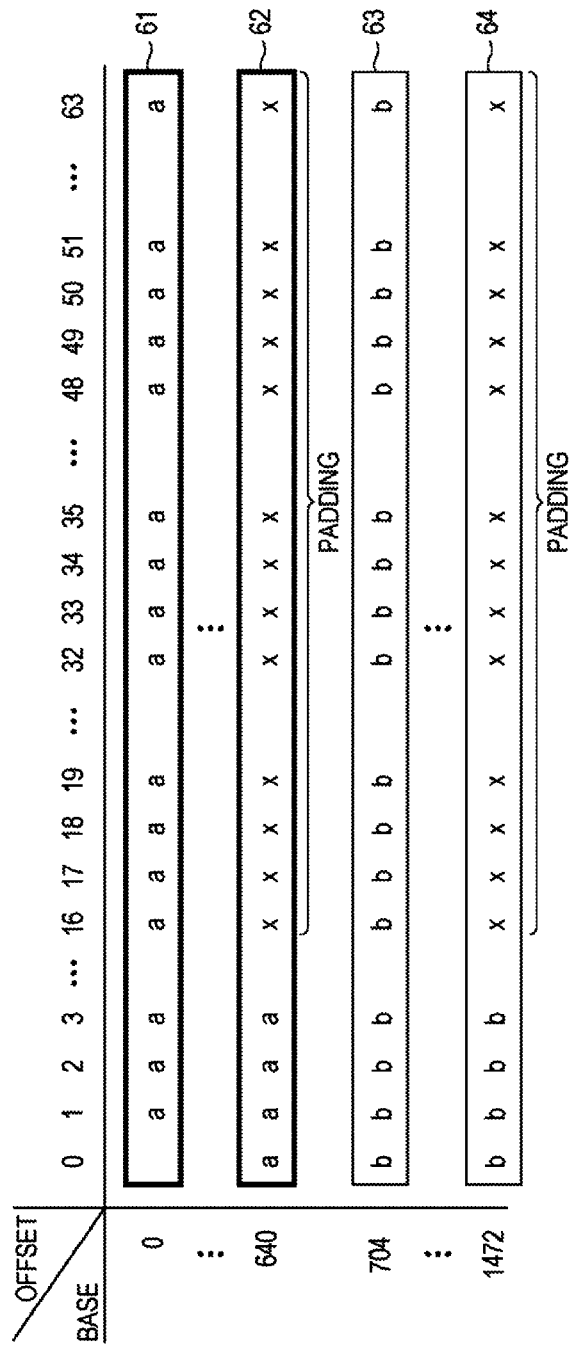
FIG. 19 is a diagram illustrating an example of route information being set to a leaf switch, according to a second embodiment.

FIG. 19 is a diagram illustrating an example of route information being set to a leaf switch, according to a second embodiment. FIG. 19 represents route information being set in the FDB of a leaf switch in a manner similar to FIG. 15.

In the FDB of FIG. 19, padding has been done between different port numbers. Specifically, when the addresses assigned to the same port number has exhausted in the middle of a data block, areas to the end of the data block is processes as non-used areas. Therefore, each port number is always stored so that the same port number is stored within 11 consecutive data blocks. When padding is not done, some different port numbers may be stored over 12 data blocks. In this embodiment, however, the number of consecutive data blocks in which the same port number associated with consecutive destination addresses is stored may be the same value. As a result, even if any spine switch has failed, a time taken to update the FDB when setting an alternative route may be made uniform.

When 11,664 compute nodes are present as in the second embodiment, the number of data blocks to be updated can be reduced to about one-eighteenth of the number of data blocks needed for the known method. As a result, it may be inferred that the update time is reduced to a time range from about 2.6 seconds to about 6.6 seconds.

In the examples of the above embodiments, although a fat tree topology has been used, the embodiments may be applied to other network topologies in which alternative routes are allowed to be formed.

Furthermore, these embodiments may be applied to network systems that conform to non-InfiniBand specifications provided that addresses are allowed to be dynamically assigned in the network systems.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer-readable, non-transitory medium storing instructions for causing a computer included in each of a plurality of relay nodes in a network to execute a procedure comprising:

providing each relay node with a forwarding database storing route information indicating a correspondence between destination addresses and port numbers assigned to output ports of the each relay node, the forwarding database being configured to store a port number in association with one or more addresses by using a data block by which at least one port number associated with a predetermined number of consecutive addresses are written into the forwarding database at a time;

storing a first port number assigned to output ports each being provided for different one of the plurality of relay nodes, in association with first consecutive addresses, by writing one or more data blocks including the first port number associated with the first consecutive addresses into the forwarding database; and updating the forwarding database, upon detecting a failure of a node connected to the output ports to which the first port number is assigned, by rewriting only the one or more data blocks including the first port number associated with the first consecutive addresses.

2. The computer-readable, non-transitory medium according to claim 1, wherein the one or more data blocks exclude a port number other than the first port number.

3. An apparatus operating as each of a plurality of relay nodes in a network, the apparatus comprising:

a memory to store a forwarding database storing route information indicating a correspondence between destination addresses and port numbers assigned to output ports of each relay node, the forwarding database being configured to store a port number in association with one or more addresses using a data block by which at least one port number associated with a predetermined number of consecutive addresses are written into the forwarding database at a time; and a processor to:

store a first port number assigned to output ports each being provided for different one of the plurality of relay nodes, in association with first consecutive addresses, by writing one or more data blocks including the first port number associated with the first consecutive addresses into the forwarding database, and update the forwarding database, upon detecting a failure of a node connected to the output ports to which the first port number is assigned, by rewriting only the one or more data blocks including the first port number associated with the first consecutive addresses.

4. The apparatus according to claim 3, wherein the one or more data blocks exclude a port number other than the first port number.

5. A method performed by each of a plurality of relay nodes in a network, the method comprising:

providing each relay node with a forwarding database storing route information indicating a correspondence between destination addresses and port numbers assigned to output ports of the each relay node, the forwarding database being configured to store a port number in association with one or more addresses by using a data block by which at least one port number associated with a predetermined number of consecutive addresses are written into the forwarding database at a time; and storing a first port number assigned to output ports each being provided for different one of the plurality of relay nodes, in association with first consecutive addresses, by writing one or more data blocks including the first port number associated with the first consecutive addresses into the forwarding database; and updating the forwarding database, upon detecting a failure of a node connected to the output ports to which the first port number is assigned, by rewriting only the one or more data blocks including the first port number associated with the first consecutive addresses.

6. The method according to claim 5, wherein the one or more data blocks exclude a port number other than the first port number.

* * * * *